(12) United States Patent
Gulati et al.

(10) Patent No.: US 7,017,079 B2
(45) Date of Patent: Mar. 21, 2006

(54) FAULT DIAGNOSIS (75) Inventors: Ankush Gulati, Bangalore (IN); Riti Singh, Bedfordshire (GB); Marco Zedda, Derby (GB)

(73) Assignee: Rolls-Royce PLC, London (GB)

( * ) Notice: Subject to any disclaimer, the term of this patent is extended or adjusted under 35 U.S.C. 154(b) by 689 days.

(21) Appl. No.: 10/228,213

(22) Filed: Aug. 27, 2002

(65) Prior Publication Data

US 2003/0088809 A1 May 8, 2003

(30) Foreign Application Priority Data

Nov. 1, 2001 (GB) ................................ 0126298

(51) Int. Cl.
*G06F 11/00* (2006.01)
(52) U.S. Cl. .................. 714/25; 714/1; 714/47; 706/12; 706/13; 706/14; 702/185
(58) Field of Classification Search .................. 714/1, 714/25, 47; 702/185; 706/12–14
See application file for complete search history.

(56) References Cited

U.S. PATENT DOCUMENTS

| | | | |
|---|---|---|---|
| 5,105,372 A | 4/1992 | Provost et al. | |
| 5,539,652 A | 7/1996 | Tegethoff | |
| 5,897,629 A | 4/1999 | Shinagawa et al. | |
| 6,052,678 A | 4/2000 | Itoh et al. | |
| 6,182,057 B1 * | 1/2001 | Kikuchi et al. | ............ 706/13 |
| 6,219,805 B1 * | 4/2001 | Jones et al. | ............ 714/38 |
| 6,282,527 B1 | 8/2001 | Gounares et al. | |
| 6,324,659 B1 | 11/2001 | Pierro | |
| 6,606,580 B1 * | 8/2003 | Zedda et al. | ............ 702/185 |
| 2001/0034628 A1 | 10/2001 | Eder | |

FOREIGN PATENT DOCUMENTS

EP   1 103 926 A2   5/2001

OTHER PUBLICATIONS

Gulati, Ankush et al., "Gas Turbine engine and Sensor Multiple operating point analysis using optimization techniques," American Institute of Aeronautics and Astronautics, presented at the 36th AIAA/ASME/SAE/ASEE Joint Propulsion Conference and Exhibit, Huntsville, Alabama, Jul. 17-19, 2000. AIAA-2000-3716, pp. 1-8.

(Continued)

*Primary Examiner*—Robert W. Beausoliel
*Assistant Examiner*—Emerson Puente
(74) *Attorney, Agent, or Firm*—Oliff & Berridge, PLC (57) ABSTRACT

The performance of each component in the system is defined by performance parameters x, which are related to measurement parameters z expressed as a function h( ) of the performance parameters x and operating parameters w. The method comprises: (a) setting an assumed maximum number of fault affected components and defining a series of fault classes corresponding to possible outcomes in terms of faulty components, (b) creating an initial population of strings for each fault class, each comprising a plurality of elements corresponding to the performance and operating parameters (c) optimising for each class an objective function J(x,w) which gives a measure of the consistency between measured values and calculated values of the measurement parameters calculated using said function of the performance parameters and the operating parameters h(x,w), and (d) selecting the class having the best value of the objective functions.

18 Claims, 3 Drawing Sheets layout of the diagnostic system

OTHER PUBLICATIONS

Gulati, Ankush et al., "Multiple Operating Point Analysis Using Genetic Algorithm Optimisation for Gas Turbine Diagnostics," presented at XV International Symposium on Air-Breathing Engines (ISABE), Bangalore, India, Sep. 2-7, 2001. ISABE-2001-1139, pp. 1-8.

Zedda, M. et al., "Gas Turbine Engine and Sensor Fault Diagnosis Using Optimisation Techniques," American Institute of Aeronautics and Astronautics, presented at the 35th AIAA/ASME/SAE/ASEE Joint Propulsion Conference and Exhibit, Jun. 20-24, 1999, Los Angeles, California. AIAA 99-2530, pp. 1-11.

Zedda, M. et al., "Gas Turbine Engine and Sensor Diagnostics," XIV International Symposium on Air-Breathing Engines (ISABE), Florence, Italy, Sep. 5-10, 1999. ISABE 99-7238.

Stamatis, A. et al., "Discrete Operating Conditions Gas Path Analysis," AGARD Conference Preprint Nr 448, Quebec, Canada.

* cited by examiner

Fig. 1: layout of the diagnostic system

Fig. 2: sensor validation for a simple system

Fig. 3: check on the measurements supposed to be biased

FAULT DIAGNOSIS

FIELD OF THE INVENTION

This invention relates to methods and systems for fault diagnosis, in particular, although not necessarily exclusively, for the detection of faults in multi-component systems, typically power plant, whose performance is characterised by a series of indirectly measurable performance parameters. One specifically envisaged application of the invention is the detection and quantification of faults in a gas turbine.

BACKGROUND OF THE INVENTION

Analysis of the performance of gas turbines is important for both testing of development engines and condition monitoring of operating engines. In particular, the ability to accurately and reliably identify the component or components responsible for loss of performance would be particularly beneficial. However, the nature of a gas turbine means there are inherent problems to be addressed if this is to be achieved in practice.

In common with other power plant, a gas turbine's performance can be expressed in terms of a series of performance parameters for the various components of the system. Typically, those chosen to characterise the performance of a gas turbine would be the efficiency and flow function of compressors and turbines and the discharge coefficient of nozzles. Significantly, these performance parameters are not directly measurable. They are, however, related to measurable parameters, such as spool speeds, averaged pressures and temperatures, thrust and air flows, and any loss in performance of a component will be reflected by changes in these measurable parameters (referred to hereinafter as "measurement parameters").

Given a particular operating point, typically defined by environmental conditions and a power setting (inlet temperature and pressure, and fuel flow for example, or other such operating parameters), the relationship between measurement parameters and performance parameters can be represented, for example, in a performance simulation model describing the aerothermodynamics of the gas turbine's components. In principle this enables the performance parameters, and more importantly changes in them from respective reference values, to be calculated. In turn, it should be possible, from these calculated values, to detect a drop in the performance of one or more components and hence deduce the cause of a loss in performance.

In practice, however, it has been found difficult accurately and reliably to relate the calculated changes in performance parameters to the presence of faults in specific components, particularly when deviations from normality or baseline performance are relatively low. This is due at least in part to the non-linearity of the relationship between the measurement parameters and the performance parameters.

There are, however, a number of further obstacles to this diagnostic task. In particular, sensors used to collect the measurement parameters necessarily work in a harsh operating environment. This leads to large measurement noise and a high probability of systematic errors (i.e. biases) in the sensor suite. The same problems affect the measured operating parameters (e.g. environment and power setting parameters). To be effective a diagnostic method has to be able to account for these measurement uncertainty effects.

The term "fault" is used here and in the following to refer to deviations in performance parameters associated with the components from expected, or reference values, often referred to as base line values, as well as errors in measured values arising from measurement biases. Of particular interest is the isolation of faulty component or components in the system and quantification of the loss in performance. In this respect, the identification of faulty measurements (i.e. measurement biases) can be important because they may result in false indications of the values of associated performance parameters.

One approach to estimating the performance parameters and the operating parameters is based on the optimisation (typically the minimization) of an objective function. For example, taking a multi-component systems whose performance can be expressed in terms of a series of performance parameters, which can in turn be related to measurement parameters, the relationship between the performance and measurement parameters can be expressed as $$\underline{z} = h(\underline{x}, \underline{w}) + \underline{b} + \underline{v}$$

where:
$\underline{z} \in R^M$ is the measurement parameter vector and M is the number of measurement parameters;
$\underline{x} \in R^N$ is the performance parameter delta vector (i.e. relative variation of the performance parameters with respect to a base line or reference value) and N is the number of performance parameters;
$\underline{w} \in R^P$ is the operating parameter vector (i.e. the vector of actual environment and power setting parameters representing the operating condition of the system) and P is the number of operating parameters;
h( ) is a vector-valued function (which in many cases will be a non-linear function) representing the relationship between the performance parameters and the measurement parameters;
$\underline{b}$ is a measurement bias vector; and
$\underline{v}$ is a measurement noise vector.

The measured values of the environment parameters will also be liable to be affected by noise and biases, giving:

$$\underline{u} = \underline{w} + \underline{b}_w + \underline{v}_w$$

where:
$\underline{u}$ is the vector of measured values of the operating parameters;
$\underline{b}_w$ is the vector of biases on these measured values; and
$\underline{v}_w$ is the vector of noise on these measured values.

An appropriate objective function for minimisation might be:

$$J(\underline{x}, \underline{w}) = \sum_{j=1}^{M} \frac{|z_j - h_j(\underline{x}, \underline{w})|}{z_{odj}(\underline{w}) \cdot \sigma_j}$$

where:
$z_{odj}(\underline{w})$ is the value of the j-th measurement (i.e. the j-th element of the measurement parameter vector) in the 'off design', undeteriorated condition; and
$\sigma_j$ is the noise standard deviation of the j-th measurement. Noise is assumed to have a Gaussian probability density function (pdf), however discrepancies from this model are likely to exist. It is for this reason that absolute values are used in the proposed objective function, rather than the more conventional use of squares, because absolute values give better robustness. The use of absolute values also provides better robustness to modelling errors, e.g. during the simulation of gas turbine performance discussed below. Where this robustness is not required, squared values can be used.

This objective function (J) is a measure of the consistency between actual measurements taken from the system, that is to say measured values of the measurement parameters (z), and calculated values of the measurement parameters, calculated by employing function h( ), which will typically be embodied in a performance simulation model.

Minimisation of the objective function (J) gives estimated values for the performance and operating parameters (x, w). A variety of techniques exist for minimisation of the objective function and need not be explained in detail here. One preferred approach is to use a Genetic Algorithm (GA), described in more depth further below. This and other optimisation techniques will generally involve multiple evaluations of the objective function before a minimum (or otherwise optimum) solution is found.

A simple comparison between estimated values of the performance parameters obtained in the above manner and the reference, or base line values for the performance parameters can then in principle reveal loss of performance and hence potential faults. However, in this approach, although reference to the standard deviation of the measurements provides some allowance for noise, no account is taken of possible measurement biases in one or more of the M measurement parameters. In practice, this basic approach does not therefore lead to satisfactory estimation of the performance parameters and consequently does not enable the accurate identification of faulty components of the system.

A modified approach, in which measurement biases are taken into account in the optimisation (e.g. minimisation) of the objective function, has been proposed in Zedda M. and Singh R., "Gas Turbine Engine and Sensor Diagnostics", IS10/UNK010, XIV International Symposium on Air-Breathing Engines (ISABE), 5–10, Sep. 1999, Florence, Italy, and in Zedda M. and Singh R., "Gas Turbine Engine and Sensor Fault Diagnosis Using optimisation Techniques", AIAA 99–2530, AIAA/SAE/ASME/ASEE 35th Joint Propulsion Conference and Exhibit, 20–24, Jun. 1999, Los Angeles, Calif.

Essentially this modified approach provides a method for estimating the performance of and/or detecting faults in components of a multi-component system in which a maximum number $M_{bias}$ of biased measurements is selected. The objective function J(x,w) is optimised using an 'Evolutionary' optimisation technique involving multiple evaluations of J(x,w). Each time the objective function J(x,w) is evaluated, a plurality of possible values for the objective function is calculated, each possible value being calculated by determining the objective function with a different $M_{bias}$ of the measurement parameters eliminated. The value of the minimum one of said plurality of calculated possible values is then assigned as the value of the objective function.

The Evolutionary optimisation technique proposed by Zedda and Singh uses an Evolution Program (EP) which is a modified form of a Genetic Algorithm (GA). GAs are a popular approach to solving problems involving complex, typically non-smooth, functions. In particular they lend themselves to the evaluation of multi-component systems. They can be applied to the problem of optimising, for instance minimising, the objective function J(x,w), in order to estimate values for the performance parameters x and operating parameters w based on the measured values of the measurement parameters z.

GAs are in effect search algorithms based on the mechanics of natural selection. A population of possible solutions to a problem, each represented by a string of information, is initially created. Each of these possible solutions is evaluated to determine its 'fitness', in effect the likelihood that it is close to the correct solution. A second generation population of possible solutions is then created based on a combination of a principal of survival of the fittest among the strings ("selection") with a structured yet random exchange of information between the strings ("cross-over") and alteration of information within the strings ("mutation") with the aim of imitating some of the innovative flair of a human approach. This process is repeated for a number of generations until the population of solutions converges to (or hopefully at least towards) the correct solution.

To take the example of the objective function introduced above, $$J_{k,l}(\underline{x}, \underline{w}) = \sum_{\substack{j=1 \\ j \neq k,l}}^{M} \frac{|z_1 - h_j(\underline{x}, \underline{w})|}{z_{odj}(\underline{w}) \cdot \sigma_j}$$

the first generation population of a GA would comprise a series of strings, each string representing one 'guess' at the values of the performance parameters $\underline{x}$ and operating parameters $\underline{w}$. The objective function would then be evaluated for each string in the population and a fitness value assigned to each string on the basis of the respective value assigned to the objective function—a low value of the objective function indicates the likelihood of a better estimate of the parameters and hence a higher fitness is assigned.

A second generation of strings is then created, the fitter strings from the first generation having the better chance of surviving to the second generation through a process of selection. The strings selected for the second generation will also be subjected to cross-over and mutation. Cross-over occurs between randomly selected pairs of strings, in which for instance a random position is selected along the length of the strings and all values of the elements (i.e. the performance and/or operating parameters) in the strings after that position are swapped with one another. In mutation single strings are randomly selected and one or more elements of the selected strings are mutated, for example by the addition of a randomly generated number.

Various forms of these three operators, selection, cross-over and mutation used in EP/GAs are well known to the skilled person.

The Evolutionary optimisation technique proposed by Zedda and Singh uses a uniquely constrained form of this GA based approach to optimise the objective function. Specifically, it is proposed to assume a limit to the maximum number of fault affected components in the system, which in turn defines a maximum number of fault affected performance parameters (i.e. those parameters that define the performance of the fault affected components). This assumption is then used to constrain, in a structured way, both the initial generation of the population used in the GA and the creation of subsequent generations using the selection, cross-over and mutation operators.

More specifically, the strings in the initial population are categorised to form sub-populations which will be referred to as "fault classes", each fault class representing one possible outcome in terms of faulty components. To take the very simple example of a three component system, and the assumption that a maximum of one component can be faulty, there would be three fault classes, one for a fault in each component. If it were assumed that a maximum of two components can be faulty, there would be three additional fault classes representing the possible combinations of faulty pairs of the three components.

In a more general example with X components, any 1 to S of which may be faulty, there will be $X!/(X-1)!1!$ fault classes for the case where one component may be faulty, $X!/(X-2)!2!$ fault classes for the case where 2 components may be faulty, and so on up to $X!/(X-S)!S!$ fault classes for the case where S components may be faulty. The total number of fault classes is therefore the sum of:

$$X!/(X-1)!1!+X!/(X-2)!2!+ \ldots +X!/(X-S)!S!.$$

In the initial creation of the strings, the values assigned to their elements representing estimated values of the performance parameters x (preferably expressed as delta values, that is to say a percentage variation from the undeteriorated base line values) are constrained in accordance with the fault class to which the string belongs. Thus, only the performance parameters associated with the fault affected component or components of the fault class are allowed to vary from the base line values (i.e. be non-zero in the preferred case of delta values).

In the creation of subsequent generations of strings during the progress of the GA optimisation, the selection operator is allowed to operate across the whole population, so that all of the fault classes compete with one another as is desired.

On the other hand, where the cross-over operator is used it is constrained to operate on pairs of strings selected from the same fault class. In this way the fault classes do not pollute one another with inappropriate fault affected parameters, as would be the case if cross-mating occurred between fault classes.

Similarly, the mutation operator is constrained to prevent pollution of the fault classes with fault affected performance parameters not associated with the fault affected components of the class. This is achieved by constraining the mutation operator so that it does not operate on string elements representing performance parameters other than those performance parameters associated with the fault affected components within a class.

After a number of iterations, due to competitive selection across the fault classes, the populations of all bar one of the fault classes should die down or become extinguished and the remaining class with the majority population should be the "correct fault class" for the fault affected performance parameters. In this way it is possible to identify the faulty components.

The constrained approach to optimising the objective function has been shown to provide satisfactory results when the multi-component system under investigation is well instrumented. That is to say, when a relatively large number of measurement parameters can be measured from the system. A typical example of a well instrumented system would be a gas turbine in its development stage.

Problems are encountered, however, when relatively few measurement parameters are available from the system under investigation, such as for example would typically be the case in pass off tests for a gas turbine. The problem is particularly acute when the number of measurements available to evaluate the objective function, taking into account any elimination of parameters through measurement biases is fewer than the number of performance parameters and operating parameters to be estimated.

It has been proposed in the past to address this lack of data by using measurements from a plurality of operating points to extract additional data from the limited set of sensors. Such a multiple operating point analysis (MOPA) is described, for instance, in Stamatis, A., Papaliou, K. D., 1988: *"Discrete operating condition gas path analysis"*, AGARD Conference Preprint Nr 448, Quebec, Canada. However, the solution of a problem relying on MOPA is significantly more complex than a single operating point approach, due to the larger number of operating parameters that must be accounted for and the added level of complexity introduced to the objective function, making its optimisation difficult to achieve.

However, as described in Gulati A., Zedda M. and Singh R., *"Gas Turbine engine and Sensor multiple operating point analysis using optimization techniques"*, AIAA 2000-3716, AIAA/SAE/ASME/ASEZ 36th Joint Propulsion Conference and Exhibit, 17–19, Jun. 2000, Huntsville, Ala., satisfactory results have been achieved by using a MOPA approach in combination with the constrained optimisation approach set forth above.

When applying the constrained evolutionary optimisation approach of either Zedda and Singh or Gulati, Zedda and Singh, an occasional problem, however, is the dying down or extinction of the correct fault class. This is generally associated with convergence towards an "incorrect fault class". The problem is particularly acute when the faults comprise low rates of deterioration (e.g. less than 1%) of the system's components.

SUMMARY OF THE INVENTION

In general, the present invention provides methods and systems for processing data relating to the performance of systems having a number of distinct components, with the aim of detecting "faults" in the components of the system. The present invention proposes, in preferred embodiments, an Evolutionary Program (EP) based optimisation technique suitable for optimisation of the objective function discussed above, although the invention has wider applicability also.

In particular, we have recognised that, when applying the constrained evolutionary optimisation approach described above, the problem of the dying down or extinction of the correct fault class can be caused by a non-uniform distribution of high fitness strings among the strings in the initial population. That is, occasionally the correct fault class receives only a relatively small initial number of high fitness strings. This leads to a reduced population for this class which can then lead to lower fitness values. In this way the population of an incorrect fault class is able to grow at the expense of the correct fault class. Thus we introduce the concept of independently optimising the objective functions for the respective fault classes so that the selection of the or each best fault class can be made on the basis of completely or substantially completely optimised objective functions.

Thus a first aspect of the present invention provides a method for estimating the performance of components of a multi-component system (which may be a power plant such as a gas turbine engine), the performance of each component in the system being defined by one or more performance parameters x, and the performance parameters x being related to measurement parameters z which can be expressed as a function h( ) of the performance parameters x and operating parameters w defining an operating condition of the system;

the method comprising:

(a) setting an assumed maximum number of fault affected components and, based on this, defining a series of fault classes corresponding to possible outcomes in terms of faulty components, (b) creating an initial population of strings for each fault class, each string comprising a plurality of elements corresponding to the performance parameters x and operating parameters w, values being assigned to the string elements which represent estimated values of said parameters and which are constrained only to indicate fault affected values for performance parameters defining the performance of the fault affected component or components of the respective class, (c) optimising for each class an objective function J(x,w) which gives a measure of the consistency between measured values of the measurement parameters z collected from the system and calculated values of the measurement parameters calculated using said function of the performance parameters and the operating parameters h(x,w), and (d) selecting the class or classes having the best value or values of the objective function;

said optimisation at step (c) being performed for each class independently of the optimisations for the other classes and being an Evolutionary Program based method comprising the steps of:

(i) evaluating the objective function for each of the strings in the respective population and, on the basis of this evaluation, assigning a fitness value to each string, and (ii) creating a next generation population of strings using a selection operator and at least one of a cross-over operator and a mutation operator, the selection operator employing the assigned fitness values to determine the strings that survive to the next generation, the cross-over operator, if used, being constrained to operate on pairs of strings from the same fault class, and the mutation operator, if used, being constrained so that it does not operate on string elements representing performance parameters other than those performance parameters associated with the fault affected components within the respective class.

Typically, a number of further iterations around steps (i) and (ii) of the optimisation process will be required to achieve convergence, and thus preferably steps (i) and (ii) are sequentially repeated a plurality of times with further iterations the population of each fault class converges towards a string representing the best estimate of actual performance and operating parameters for that class. Preferably steps (i) and (ii) are repeated an equal or a substantially equal number of times for each class.

Therefore, by constraining cross-over and mutation in the manner defined the integrity of each fault class is retained, and by optimising each fault class separately there is no competition between fault classes for the purpose of selection. At the end of the iterations around steps (b) and (c), the fault class having the best value (i.e. the least value in the case of a minimisation optimisation) of the objective function represents the faulty components. Also the values of the performance parameters x which produce the best value of the objective function quantify the loss of performance in the faulty components.

A further advantage is that values of the objective function are available for each fault class, which allows for comparison between fault classes. In the approach of Zedda and Singh described previously only one fault class survived so that such a comparison was not possible.

Yet another advantage is that the optimisations of the objective functions for the fault classes may be performed in parallel (i.e. simultaneously), e.g. on a corresponding number of processors. Thus, although the overall computational burden may be increased compared with known methods, the actual time required to arrive at a particular solution may be reduced.

If desired, the power of the search carried out by the Evolution Program approach proposed above, may be improved by supplementing it with what might be termed a local search or optimisation algorithm. One suitable form of local search algorithm that can be used for this purpose are so called Evolution Strategies (ES), described for example in Michalewicz, Z., 1996: *"Genetic Algorithms+Data Structures=evolution programs"*, Springer Verlag, 3rd Edition. Other suitable forms are e.g neural networks, calculus-based techniques, and fuzzy logic techniques.

Thus the method may comprise the further step of further optimising the objective function for the or each selected fault class by performing a local search on each selected fault class. In particular, when a plurality of classes have been selected at step (d) and the optimised objective functions of the selected fault classes have similar values (as occasionally happens), the result of this optional additional step may be used to identify the "correct" fault class. Even if it is not possible to identify the "correct" fault class in this way, it is often found that the competing selected fault classes have one or more components in common, which components are likely to be those which are faulty.

Alternatively (or additionally), the present invention may employ a local search algorithm, to periodically refine the better strings in each fault class of the series of fault classes. For example, the best m strings in each fault class might be used to initialise a series of ES (one for each fault class) every n iterations (i.e. generations) of the GA (or other EP). The ES are run starting from these initial values for a fixed number of iterations. If the final solutions given by an ES are better (i.e. result in lower values of the objective function) than the m strings with which the ES was initialised, the strings are substituted with the results of the ES prior to the next iteration of the GA. Typically, m=5 and n=10 would be appropriate to give some enhancement of the method without increasing the computational burden too greatly.

The method also allows measurement biases to be taken into account in the optimisation of the objective function, e.g. using the approach described by Zedda and Singh.

A further aspect of the present invention provides a method for estimating the performance of components of a multi-component gas turbine engine, the performance of each component in the gas turbine engine being defined by one or more performance parameters x, and the performance parameters being related to the measurement parameters z which can be expressed as a function h( ) of the performance parameters x and operating parameters w defining an operating condition of the gas turbine engine;

the method comprising;

(a) setting an assumed maximum number of fault-affected components and, based on this, defining a series of fault classes corresponding to possible outcomes in terms of faulty components, (b) optimising for each class independently of the optimisations for the other classes an objective function J(x,w) which gives a measure of the consistency between measured values of the measurement parameters z collected from the gas turbine engine and calculated values of the measurement parameters calculated using said function of the performance parameters and the operating parameters h(x,w), and (c) selecting the class or classes having the best value or values of the objective function.

Thus the concept of independently optimising objective functions for respective fault classes can be extended to cover optimisation techniques other than Evolutionary Programs. For example, simpler and less burdensome (in terms of computing requirements) optimisation techniques can be used at step (b), such as Powell's method. Other optimisation techniques would be known to the skilled person. However, to improve the robustness of the method, an EP based optimisation technique may be preferred for performing step (b) if e.g. there are measurement biases present in the measurement parameters.

The measurement parameters may be taken from the system at a plurality of operating points so that the method of either of the previous aspects of the invention implements a MOPA approach e.g. as described by Gulati, Zedda and Singh.

The methods of the invention discussed above may conveniently be implemented in software, for execution on any appropriate digital computer including one or more memory devices for storing the various data and one or more processors for executing the methods.

Thus further aspects of the invention respectively provide a computer or linked computers operatively configured to implement any of the methods of the previous aspects of the invention; computer programming product or products (such as ROM, RAM, floppy discs, hard drives, optical compact discs, magnetic tapes, and other computer-readable media) carrying computer code for implementing any of the methods of the previous aspects of the invention; and a computer program per se for implementing any of the methods of the previous aspects of the invention.

BRIEF DESCRIPTION OF THE DRAWINGS

Aspects of the invention will be further described by way of example with reference to the accompanying drawings, in which.

DETAILED DESCRIPTION OF THE INVENTION

Figure 1:
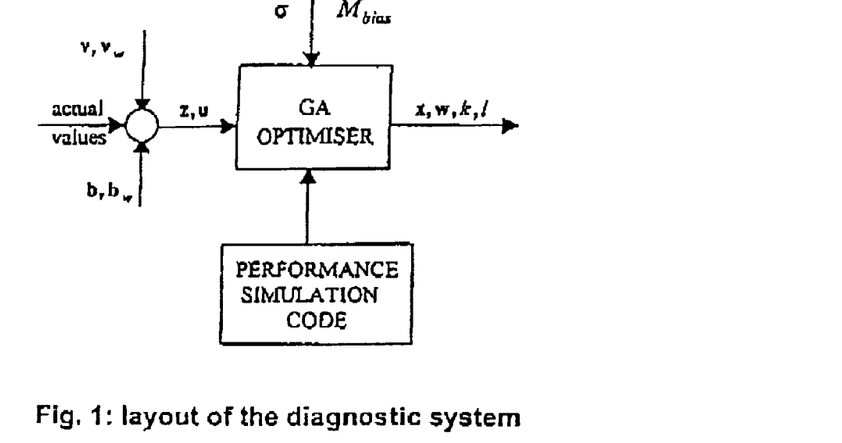
FIG. 1 illustrates the general layout of an example diagnostic system according to an embodiment of the invention.

The present invention was embodied in an example diagnostic system. FIG. 1 shows the basic layout of the system. The inputs to the system are the measured values of the measurement parameters $\underline{z}$ and the measured values of the operating parameters $\underline{u}$. The maximum number of biased measurements $M_{bias}$ and the measurement noise standard deviation $\sigma$ are also inputs to the system. The maximum number of fault affected components, and hence the maximum number of fault affected parameters $N_{perf}$ is pre-set in the system in this example.

The system itself comprises a genetic algorithm (GA) based optimiser, which is implemented in software. Embodied in the optimiser is the objective function on which the optimisation is based along with routines to establish the necessary population of solutions, sub-divided into fault classes, and to run the constrained GA to minimise the objective function in the manner already discussed above. The system also comprises a performance simulation model to provide the calculated values of the measurement parameters $h(\underline{x},\underline{w})$ and $Z_{adj}(\underline{w})$, based on the estimated performance and operating parameters, necessary for evaluation of the objective function.

The output from the diagnostic system, once the optimisation has been completed, are the final estimated values of the performance parameters delta values x (i.e. the variation of the performance parameters from base line values) and operating parameters $\underline{w}$, along with an identification of the biased measurement parameters k, l.

Figure 2:
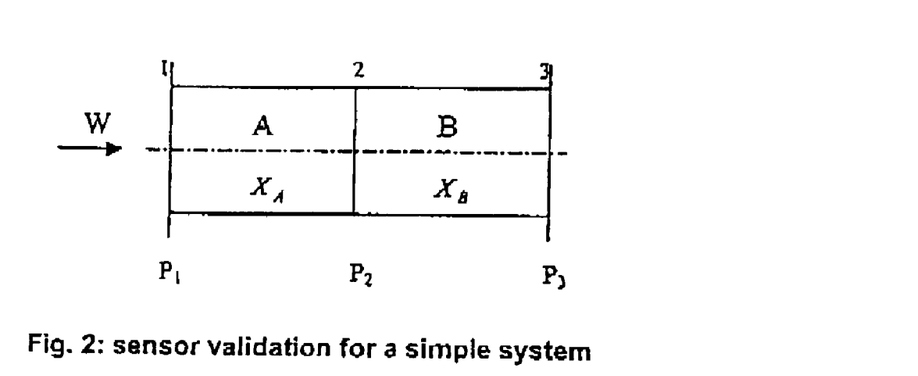
FIG. 2 illustrates a simple system used to exemplify a sensor validation function of the diagnostic system.

With reference to FIG. 2, the manner in which measurement biases can be accounted for (referred to as "sensor validation") will be exemplified.

FIG. 2 illustrates a pipe, which is divided in two parts, A and B. A flow passes through the pipe. Pressures at stations 1, 2 and 3 are measured. The performance of parts A and B is quantified by variables $X_A$ and $X_B$ respectively. The three pressures (P) are known functions of the performance parameters:

$$P_1 = h_1(X_A, X_B) \quad (1)$$

$$P_3 = h_3(X_A, X_B) \quad (2)$$

$$P_2 = h_2(X_A, X_B) \quad (3)$$

An error in $P_2$ is assumed to be present.

The classic approach to calculate the performance parameters would consist of the minimisation of the following objective function:

$$J(X_A, X_B) = \sum_{j=1}^{3} [P_j - h_j(X_A, X_B)]^2 \quad (4)$$

Looking at equations (1) through (3) it can be seen that three equations (one for each measurement) are available to calculate the two performance parameters $X_A$, $X_B$. There is one redundant equation. If no bias in the measured pressures is present, all three equations are mutually consistent (any one of them can be expressed as combination of the other 2) and so the actual minimum of the chosen objective function (4) (i.e. zero) can be reached. If, however, one of the measurements is biased, there is no mutual consistency and then the objective function (4) after optimisation will not reach zero if all measurements are used. This inability to minimise the objective function indicates that there is a sensor problem, but does not identify the faulty sensor. Moreover, the calculation of the performance parameters is likely to be inaccurate because it is based on the faulty pressure measurement.

Application of a sensor validation method in accordance with the approach of Zedda and Singh suggests that the objective function should be:

$$J_i(X_A, X_B) = \sum_{\substack{j=1 \\ j \neq 1}}^{3} [P_j - h_j(X_A, X_B)]^2 \quad (5)$$

$$J(\bar{X}_A, \bar{X}_B) = \min_{1. X_A, X_B} J_i(X_A, X_B) \quad (6)$$

However, the method does not work if just 3 measurements are available, because any one of the 3 combinations obtained by elimination of 1 sensor ($P_1$ and $P_2$, or $P_1$ and $P_3$, or $P_2$ and $P_3$) can provide a solution with the objective function equal to zero. This is because when a measurement is not used in the calculation of the objective function there is no redundancy in the remaining set (2 unknowns, 2 equations).

If, however, another measurement is available, which can be related to any of $X_A$ and $X_B$, say $M_3$, then elimination of 1 out of 4 measurements will leave a certain redundancy in the set used in the objective function: 2 unknowns are calculated by using 3 measurements. If the biased measurement is used in the objective function, the resulting inconsistency will produce a larger value of the function, whereas when the biased measurement is excluded the minimised value will be zero. The important thing is that the number of measurements used to build the objective function be larger than the number of parameters to be calculated (at least one more), so that the redundancy enables checking on the self-consistency of the measurement set. This gives rise to the requirement for R>1, where R is the measure of relative redundancy discussed above.

So long as there is adequate redundancy in the equations available for evaluation of the system, the proposed method therefore allows the biased measurement to be eliminated. By doing this, minimisation of the objective function also then provides an accurate estimate of the performance parameters and operating parameters ($\underline{x},\underline{w}$).

Figure 3:
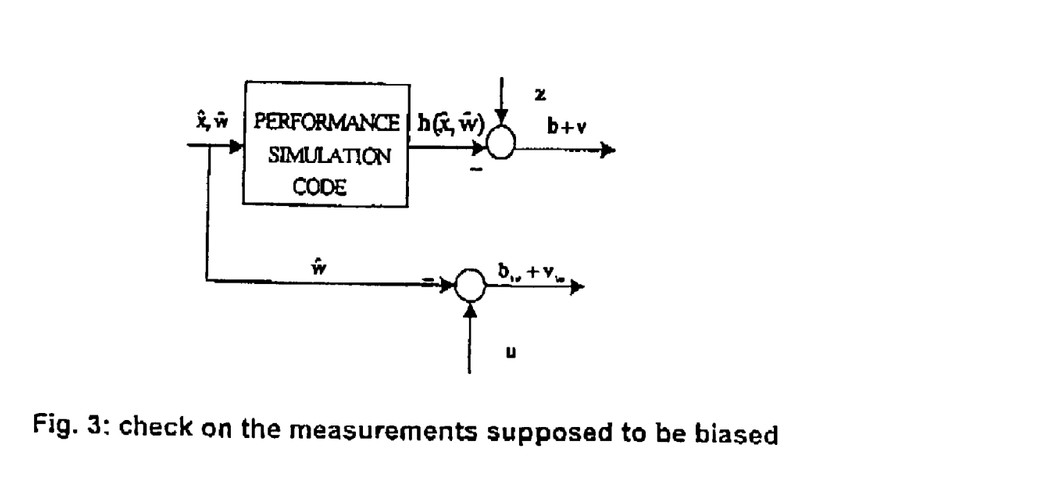
FIG. 3 illustrates use of the simulation model to calculate value of noise and bias.

Once these parameters are established, if desired they can be used, along with the performance simulation model, to obtain an estimate of the combined noise and bias effecting the measured values of the measurement and operating parameters, as indicated in FIG. 3. As can be seen the measured values $\underline{u}$ of the operating parameters are simply subtracted from the estimated actual values $\underline{w}$ arrived at after optimisation of the objective function, giving the noise and bias values $\underline{b}_w,\underline{v}_w$ for these measurements. To determine the noise a bias values $\underline{b},\underline{v}$ for the measurement parameters, the estimated performance and operating parameters are used as inputs to the performance simulation model to calculate the measurement parameters. These calculated values are then subtracted from the actual measurements to give the noise and bias. If the combined noise and bias value for any parameter is more than can be attributed to noise alone (e.g. more than three times the noise standard deviation) a bias is assumed. If desired, for future calculations the biased measurement can then be replaced by an estimated value.

As already discussed above, a GA is employed to minimise the objective function in accordance with the present invention. Significant features of the GA are:

1) The objective function is a function of the performance parameter vector $\underline{x}$ (efficiencies and flow capacities) and the operating parameter vector $\underline{w}$ (e.g. ambient pressure and temperature and fuel flow).

2) The population for each fault class is initialised randomly within constraints specified by the user such as −/+3% for the flow capacities and 0 B 3% for the efficiencies, This is done by using a random number generator. Some of the fault classes will represent faults in a single engine component, others represent faults affecting two components.

3) The classes are then separately processed by the three principle operators of the genetic algorithms, i.e. selection, crossover and mutation. All the fault classes persist through the iterations, and the objective function is determined for each fault class.

4) The selection operator uses e.g. the Stochastic Universal Sampling algorithm (Baker, J. E. 1987: *"Reducing bias and inefficiency in the selection algorithm"*, *Proceedings of the Third International Conference on Genetic Algorithms*), but the skilled person would be aware of similarly effective alternative selection techniques.

5) The crossover operator is applied to pairs of strings which are members of the same fault class. Crossmating between different fault classes is not allowed.

6) Mutation, which is the last operator to be applied reduces in size as the generations progress and is constrained to mutate only the fault affected parameters within a fault class. Mutation, when applied adds or subtracts a random value from the fault affected parameters, whilst ensuring that the maximum constraints (e.g. ±3% for flow functions and 0–3% for efficiencies) are satisfied.

7) The occurrences of both crossover and mutation are based on probability, which are set at the beginning of the iterations. For the diagnostic system the probabilities of crossover are e.g. 0.8 and that of mutation e.g. 0.2.

When dealing with GAs, a problem can be the computing power necessary to achieve convergence. Every iteration involves evaluation of the objective function for most of the strings and from the point of view of computing power the main burden is running the performance simulation code (calculating $h(\underline{x}, \underline{w})$ and $z_{odj}(\underline{w})$). Such code may involve a modified Newton-Raphson method to improve convergence of the performance simulation model.

It is worth noting here that no linearisation is ever done during any stage of the fault diagnosis. The fully non-linear approach provides accurate results, even though estimation is more complicated.

Also, as already noted, each fault class has an initial string population. In the case where two is the maximum number of faulty components there are classes for faults in a single component and classes for faults in two components. The number of strings initially assigned to every fault class may be proportional to the number of varying performance parameters for that class. For instance, the class identifying faults in the HP compressor and turbine may initially be made of a number of strings tour times larger than the class identifying faults in the propelling nozzle only, because the former includes variations in four performance parameters (efficiency and flow capacity of HP compressor and turbine) whereas the latter includes variation of a single performance parameter only (nozzle discharge coefficient). However, the overriding consideration is typically to choose the total number of strings in order to obtain the highest degree of accuracy in the shortest possible time. Also, the number of strings granted to each fault class can be regarded as deriving from a probability density function. That is, the larger the number of strings in a given fault class, the more likely that fault class is to be selected as providing a best value of the optimised function.

Thus fault classes with fewer components may need more strings than simple proportionality would suggest.

The diagnostic system uses an optimisation technique which performs MOPA based on pareto optimality (as described by Gulati, Zedda and Singh), and has been tailored for gas turbine analysis. The fitness is calculated based on levels. The entire population of each fault class is compared with each other for pareto optimality and the best individuals of the population (i.e. those having the lowest values of objective function are assigned a level 1). These are then taken out and the remainder of the population compared with each other and the best individuals assigned to level 2. This procedure is continued until all the individuals in the respective population have been assigned a level. The fitness for reproduction/selection is then assigned non-linearly in such a way that the population members in level 1 receive the highest fitness.

$$f(i)=1 \div (\text{Level}(i))$$

where: f=fitness of $i^{th}$ string and Level=level of $i^{th}$ string.

Thus the strings in level one are given the highest chance of selection for further generation and the ones in the last level the least chance. After a fixed number of iterations/generations, decided by the operator, the final solution is taken to be the individual from the first level whose $\underline{x}$ and $\underline{w}$ values result in the lowest value of a summation of the individual objective function values for each operating point.

The example diagnostic system was tested using data for the RB 199 engine, but it can be applied to any engine with a similar instrumentation set. A Rolls-Royce accurate non-linear steady state performance simulation model (RRAP) was used.

The engine for which the technique was developed, the RB 199 engine, is a three spool gas turbine and, for the purpose of this study, is considered to have 8 components (which are fan outer ($F_{out}$), fan inner ($F_{in}$), intermediate pressure compressor (IPC), high pressure compressor (HPC), high pressure turbine (HPT), intermediate pressure turbine (IPT), low pressure turbine (LPT) and nozzle (Noz)). For each component the flow capacities and efficiencies are the performance parameters of interest, except for the nozzle for which it is the nozzle discharge coefficient ($C_D$).

The engine has ten measurements, one of which (the fuel flow) is used as a power setting parameter. The other nine measurements are Fan entry total airflow, HP spool speed, LP spool speed, fan outer exit pressure and temperature, HPC exit pressure and temperature, IPC exit pressure, and thrust.

It should be borne in mind that there are no measurements within the turbines and the analysis of the turbines therefore relies on data from the compressor. Also there is no measurement for the IP spool speed. The task of performance analysis is therefore made doubly difficult i.e. not only the measurements are less but also they are not what one would typically desire.

Two components were assumed to be fault affected. A number of simulations were carried out for a variety of faults and degrees of component deterioration.

For comparison, the simulations were repeated using a comparative diagnostic system which differed from the example system described above in that the selection operator was applied across all the strings of all the fault classes.

Thus the comparative system allowed fault classes to die out so that, typically, one class eventually dominated, i.e. according to the technique described by Gulati, Zedda and Singh.

Table 1 shows the fault class numbers of the fault classes of the RB 199 engine with one and two components.

TABLE 1

| Fault class no. | Components |
|---|---|
| 1 | $F_{out}$ |
| 2 | $F_{in}$ |
| 3 | IPC |
| 4 | HPC |
| 5 | HPT |
| 6 | IPT |
| 7 | LPT |
| 8 | Noz |
| 9 | $F_{out}$, $F_{in}$ |
| 10 | $F_{out}$, IPC |
| 11 | $F_{out}$, HPC |
| 12 | $F_{out}$, HPT |
| 13 | $F_{out}$, IPT |
| 14 | $F_{out}$, LPT |
| 15 | $F_{out}$, Noz |
| 16 | $F_{in}$, IPC |
| 17 | $F_{in}$, HPC |
| 18 | $F_{in}$, HPT |
| 19 | $F_{in}$, IPT |
| 20 | $F_{in}$, LPT |
| 21 | $F_{in}$, Noz |
| 22 | IPC, HPC |
| 23 | IPC, HPT |
| 24 | IPC, IPT |
| 25 | IPC, LPT |
| 26 | IPC, Noz |
| 27 | HPC, HPT |
| 28 | HPC, IPT |
| 29 | HPC, LPT |
| 30 | HPC, Noz |
| 31 | HPT, IPT |
| 32 | HPT, LPT |
| 33 | HPT, Noz |
| 34 | IPT, LPT |
| 35 | IPT, Noz |
| 36 | LPT, Noz |

The example and comparative diagnostic systems were applied to data of a first simulation which represented the following faults:

IPC (2% flow function, 1% efficiency), and

LPT (1% flow function, 1% efficiency).

This corresponds to fault class 25 in Table 1.

Figure 4:
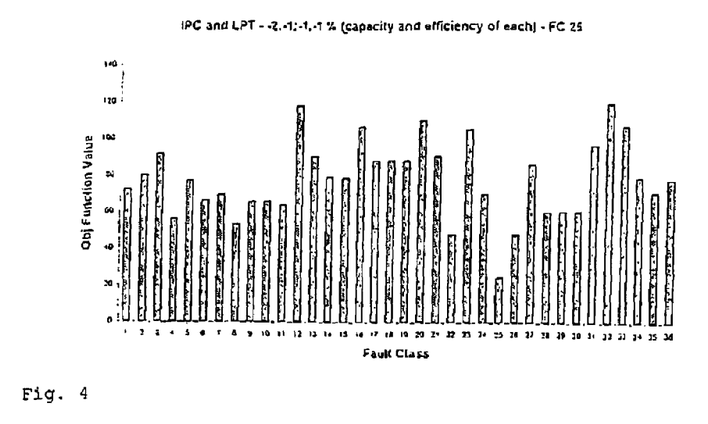
FIG. 4 shows a bar graph of the optimised objective functions for all fault classes of a first simulation as determined by the example diagnostic system.

FIG. 4 shows a bar graph of the optimised objective functions for all the fault classes determined by the example system after a predetermined number of iterations. It can be seen that fault class 25 has the least value. Hence the system was able successfully to identify the correct fault class.

Figure 5:
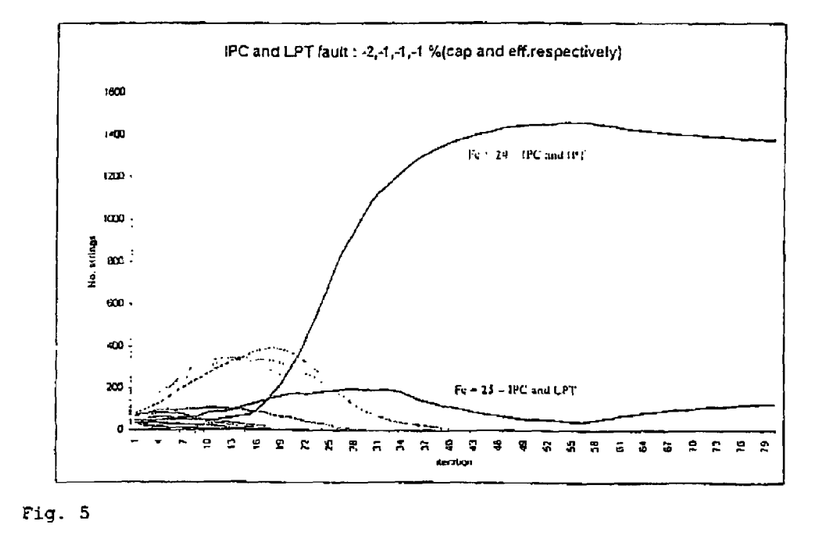
FIG. 5 shows a plot of the number of strings populating each fault class of the simulation of FIG. 4 as a function of iteration number according to a diagnosis performed by a comparative diagnostic system.

FIG. 5, on the other hand, shows a plot of the number of strings populating each fault class as a function of iteration number according to the diagnosis performed by the comparative system. In this case, fault class 25 died down and at no stage had the largest population of strings. We believe this was because the initial randomly selected population for class 25 was insufficiently "fit". Instead, from about 20 iterations onwards incorrect fault class 24 had the dominant population.

The diagnostic systems were applied to another simulation with a data set representing the following faults:

IPC (−0.4% capacity, −0.7% efficiency), and

HPC (−0.7% capacity, −0.7% efficiency).

As a further test of the capability of the example system some of the other components were randomly selected and deteriorated by −0.2% for both efficiency and capacity. Such a situation is effectively one in which the engine performance simulation model used in the diagnosis does not match with actual performance characteristics of the test engine. This situation is, in fact, commonly experienced in practice as there is usually some variation in actual engine performances, and performance models are therefore for average engines.

Figure 6:
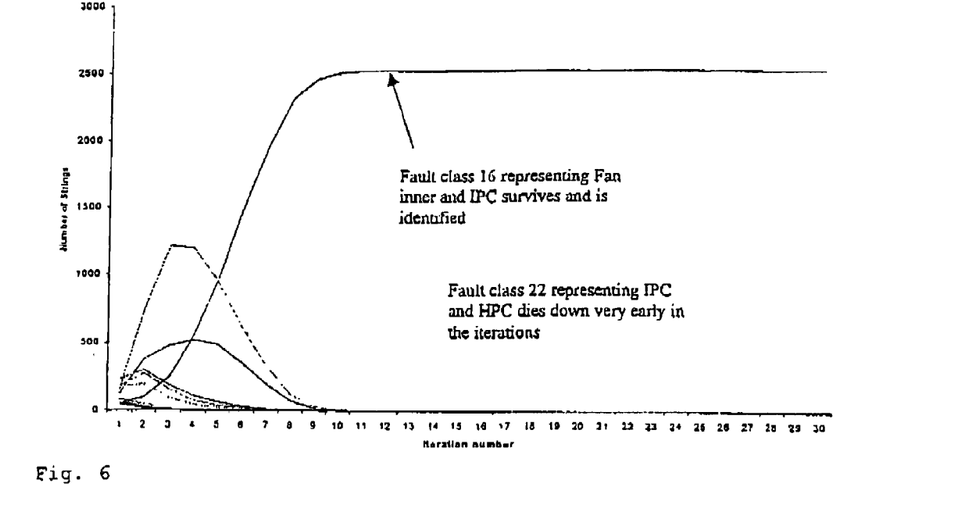
FIG. 6 shows a bar graph of the optimised objective functions for all fault classes of a second simulation as determined by the example diagnostic system.
Figure 7:
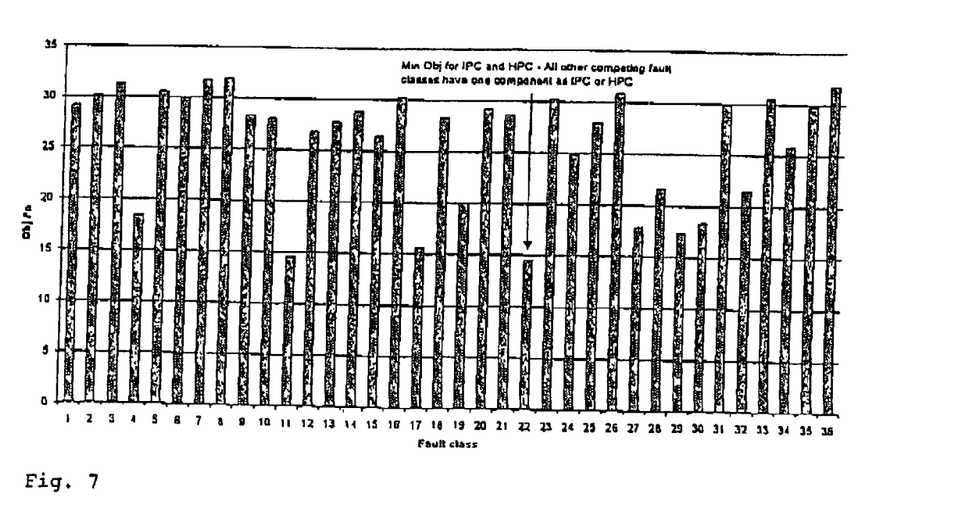
FIG. 7 shows a plot of the number of strings populating each fault class of the simulation of FIG. 6 as a function of iteration number according to a diagnosis performed by the comparative diagnostic system.

FIG. 6 shows a bar graph of the optimised (minimised) objective functions for all the fault classes determined by the example system after a predetermined number of iterations, and FIG. 7 shows a plot of the number of strings populating each fault class as a function of iteration number according to the diagnosis performed by the comparative system.

Again, we see that the example diagnostic system embodying the present invention was able successfully to identify the correct fault class (i.e. fault class 22), whereas the comparative diagnostic system extinguished the string population of fault class 22 after only about four iterations and incorrectly identified fault class 16.

Other fault classes (e.g. 11 and 17) had minimised objective functions which were relatively close to that of fault class 22. However, subsequent analysis showed that these other classes all shared at least one component in common with fault class 22. A local search performed on classes 11, 17 and 22 may have served to further distinguish class 22.

These results show that the method of the present invention can improve the accuracy and robustness of EP based optimisation techniques, and in particular may be usefully implemented in engine diagnostic systems when it is desired to detect component faults of the order of 1% or less.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The references mentioned above are hereby incorporated by reference.

What is claimed is:

1. A computer implemented method for estimating the performance of components of a multi-component system,
the performance of each component in the system being defined by one or more performance parameters x, and
the performance parameters x being related to measurement parameters z which can be expressed as a function h( ) of the performance parameters x and operating parameters w defining an operating condition of the system;
the method comprising:
(a) setting an assumed maximum number of fault affected components and, based on this, defining a series of fault classes corresponding to possible outcomes in terms of faulty components,
(b) creating an initial population of strings for each fault class, each string comprising a plurality of elements corresponding to the performance parameters x and operating parameters w, values being assigned to the string elements which represent estimated values of said parameters and which are constrained only to indicate fault affected values for performance parameters defining the performance of the fault affected component or components of the respective class,
(c) optimising for each class an objective function J(x,w) which gives a measure of the consistency between measured values of the measurement parameters z collected from the system and calculated values of the measurement parameters calculated using said function of the performance parameters and the operating parameters h(x,w), and
(d) selecting the class or classes having the best value or values of the objective function;
said optimisation being performed for each class independently of the optimisations for the other classes and being an Evolutionary Program based method comprising the steps of:
(i) evaluating the objective function for each of the strings in the respective population and, on the basis of this evaluation, assigning a fitness value to each string, and
(ii) creating a next generation population of strings using a selection operator and at least one of a cross-over operator and a mutation operator, the selection operator employing the assigned fitness values to determine the strings that survive to the next generation, the cross-over operator, if used, being constrained to operate on pairs of strings from the same fault class, and the mutation operator, if used, being constrained so that it does not operate on string elements representing performance parameters other than those performance parameters associated with the fault affected components within the respective class.

2. A method according to claim 1, further comprising:
(e) employing a local search algorithm to further optimise the objective function of the or each class selected at step (d).

3. A method according to claim 1, further comprising employing at step (c) a local search algorithm to periodically refine the better strings in the population.

4. A method according to claim 1, further comprising:
selecting a maximum number $M_{bias}$ of fault affected measurements, and
each time the objective function J(x,w) is evaluated during said optimisation, the method comprising calculating a plurality of possible values for the objective function, each possible value being calculated by determining the objective function with a different $M_{bias}$ of the measurement parameters eliminated, the value of the minimum one of said plurality of calculated possible values being assigned as the value of the objective function.

5. A method according to claim 1, wherein:
said measurement parameters z are provided for two or more different operating points of said system, step (i) of said optimisation further comprising evaluating the objective function for each of said strings for each of said two or more operating points.

6. A method according to claim 1, wherein said function ho relating the measurement parameters to the performance and operating parameters is embodied in a performance simulation model designed to simulate the performance of the multi-component system to which the method is applied.

7. A computer implemented method for estimating the performance of components of a multi-component gas turbine engine,
the performance of each component in the gas turbine engine being defined by one or more performance parameters x, and
the performance parameters being related to the measurement parameters z which can be expressed as a function h( ) of the performance parameters x and operating parameters w defining an operating condition of the gas turbine engine;

the method comprising:
(a) setting an assumed maximum number of fault-affected components and, based on this, defining a series of fault classes corresponding to possible outcomes in terms of faulty components,
(b) optimising for each class independently of the optimisations for the other classes an objective function J(x,w) which gives a measure of the consistency between measured values of the measurement parameters z collected from the gas turbine engine and calculated values of the measurement parameters calculated using said function of the performance parameters and the operating parameters h(x,w), and
(c) selecting the class or classes having the best value or values of the objective function.

8. A method according to claim 7, wherein:
said measurement parameters z are provided for two or more different operating points of said gas turbine engine, said optimisation further comprising evaluating the objective function for each of said two or more operating points.

9. A method according to claim 7, wherein said function h( ) relating the measurement parameters to the performance and operating parameters is embodied in a performance simulation model designed to simulate the performance of the multi-component gas turbine engine to which the method is applied.

10. A computer system for estimating the performance of components of a multi-component system,
the performance of each component in the system being defined by one or more performance parameters x, and
the performance parameters x being related to measurement parameters z which can be expressed as a function h( ) of the performance parameters x and operating parameters w defining an operating condition of the multi-component system;

the computer system comprising:
input means for inputting values of the measurement parameters z collected from the multi-component system;
storage means for storing said collected values of the measurement parameters z and for storing an assumed maximum number of fault affected components;
processing means for (a), based on said assumed maximum number of fault affected components, defining a series of fault classes corresponding to possible outcomes in terms of faulty components, (b) creating an initial population of strings for each fault class, each string comprising a plurality of elements corresponding to the performance parameters x and operating parameters w, values being assigned to the string elements which represent estimated values of said parameters and which are constrained only to indicate fault affected values for performance parameters defining the performance of the fault affected component or components of the respective class, and (c) calculating values of the measurement parameters z using said function of the performance parameters and the operating parameters h(x,w); and
an optimiser which is adapted to (a) apply an Evolutionary Program based method to optimise for each class, independently of the optimisations for the other classes, an objective function J(x,w) which gives a measure of the consistency between said collected values of the measurement parameters z and said calculated values of the measurement parameters z, and (b) select the class or classes having the best value or values of the objective function, said Evolutionary Program based method comprising the steps of:
(i) evaluating the objective function for each of the strings in the respective population and, on the basis of this evaluation, assigning a fitness value to each string, and
(ii) creating a next generation population of strings using a selection operator and at least one of a cross-over operator and a mutation operator, the selection operator employing the assigned fitness values to determine the strings that survive to the next generation, the cross-over operator, if used, being constrained to operate on pairs of strings from the same fault class, and the mutation operator, if used, being constrained so that it does not operate on string elements representing performance parameters other than those performance parameters associated with the fault affected components within the respective class.

11. A computer system according to claim 10, wherein the optimiser is further adapted to (c) employ a local search algorithm to further optimise the objective function of the or each selected class.

12. A computer system according to claim 10, wherein the optimiser is further adapted to employ a local search algorithm to periodically refine the better strings in the population.

13. A computer system according to claim 10, wherein:
the storage means further stores a maximum number $M_{bias}$ of fault affected measurements, and
step (i) of the Evolutionary Program based method further comprises calculating a plurality of possible values for the objective function each time the objective function J(x,w) is evaluated, each possible value being calculated by determining the objective function with a different $M_{bias}$ of the measurement parameters eliminated, the value of the minimum one of said plurality of calculated possible values being assigned as the value of the objective function.

14. A computer system according to claim 10, wherein said measurement parameters z are provided for two or more different operating points of said system, step (i) of the Evolutionary Program based method further comprising evaluating the objective function for each of said strings for each of said two or more operating points.

15. A computer system according to claim 10, wherein said to processing means comprises a performance simulation model for calculating values of the measurement parameters z, the performance simulation model being designed to simulate the performance of the multi-component system.

16. A computer system for estimating the performance of components of a multi-component gas turbine engine,
the performance of each component in the gas turbine engine being defined by one or more performance parameters x, and
the performance parameters x being related to measurement parameters z which can be expressed as a function h( ) of the performance parameters x and operating parameters w defining an operating condition of the gas turbine engine;

the computer system comprising:
input means for inputting values of the measurement parameters z collected from the gas turbine engine;

storage means for storing said collected values of the measurement parameters z and for storing an assumed maximum number of fault affected components;

processing means for (a), based on said assumed maximum number of fault affected components, defining a series of fault classes corresponding to possible outcomes in terms of faulty components, and (b) calculating values of the measurement parameters z using said function of the performance parameters and the operating parameters h(x,w); and an optimiser which (a) optimises for each class, independently of the optimisations for the other classes, an objective function J(x,w) which gives a measure of the consistency between said collected values of the measurement parameters z and said calculated values of the measurement parameters z, and (b) selects the class or classes having the best value or values of the objective function.

17. A computer system according to claim 16, wherein said measurement parameters z are provided for two or more different operating points of said gas turbine engine, and said optimiser evaluates the objective function for each of said two or more operating points.

18. A computer system according to claim 16, wherein said processing means comprises a performance simulation model for calculating values of the measurement parameters z, the performance simulation model being designed to simulate the performance of the multi-component gas turbine engine.

* * * * *